US009951677B2

(12) United States Patent
Bruggesser et al.

(10) Patent No.: US 9,951,677 B2
(45) Date of Patent: Apr. 24, 2018

(54) CHARGE-AIR COOLING DEVICE

(71) Applicant: Mahle International GmbH, Stuttgart (DE)

(72) Inventors: Veit Bruggesser, Hildrezhausen (DE); Oliver Fischer, Weinstadt-Beutelsbach (DE); Juergen Stehlig, Neckartenzlingen (DE)

(73) Assignee: Mahle International GmbH (DE)

( * ) Notice: Subject to any disclaimer, the term of this patent is extended or adjusted under 35 U.S.C. 154(b) by 426 days.

(21) Appl. No.: 14/385,167

(22) PCT Filed: Mar. 7, 2013

(86) PCT No.: PCT/EP2013/054559
§ 371 (c)(1),
(2) Date: Sep. 14, 2014

(87) PCT Pub. No.: WO2013/135546
PCT Pub. Date: Sep. 19, 2013

(65) Prior Publication Data
US 2015/0075750 A1    Mar. 19, 2015

(30) Foreign Application Priority Data
Mar. 15, 2012   (DE) ........................ 10 2012 204 121

(51) Int. Cl.
*F28F 9/013* (2006.01)
*F02B 29/04* (2006.01)
(Continued)

(52) U.S. Cl.
CPC ........ *F02B 29/045* (2013.01); *F02B 29/0462* (2013.01); *F02B 29/0475* (2013.01);
(Continued)

(58) Field of Classification Search
CPC .. F28F 9/001; F28F 9/002; F28F 9/005; F28F 9/007; F28F 9/0075; F28F 9/013;
(Continued)

(56) References Cited

U.S. PATENT DOCUMENTS 2,488,807 A * 11/1949 Currie ................... F28F 9/0241
165/159
2,512,748 A *  6/1950 Lucke ................... F28F 9/0241
165/175
(Continued)

FOREIGN PATENT DOCUMENTS

DE         19902504 A1    8/2000
DE     102007030464 A1    1/2009
(Continued)

OTHER PUBLICATIONS

English abstract for DE-19902504.
(Continued)

*Primary Examiner* — Grant Moubry
*Assistant Examiner* — For K Ling
(74) *Attorney, Agent, or Firm* — Fishman Stewart PLLLC

(57) ABSTRACT

A charge-air cooling device for a fresh air system of an internal combustion engine may include a housing which contains a charge-air duct and a heat exchanger having an internal coolant path and an external charge-air path. The housing may have a mounting opening, through which the heat exchanger is pushed into the housing in a longitudinal direction of the heat exchanger such that, in a pushed-in state, the charge-air duct leads through the charge-air path. The housing may include at least one wall in a receiving region which receives the heat exchanger. The wall may be elastic and, by the heat exchanger being pushed into the receiving region, the wall may be transferred from a relaxed state when the heat exchanger has not been pushed into the
(Continued)

receiving region, into a stressed state when the heat exchanger has been pushed into the receiving region.

20 Claims, 3 Drawing Sheets

(51) Int. Cl.
*F28F 9/00* (2006.01)
*F28D 7/16* (2006.01)
*F28F 21/06* (2006.01)

(52) U.S. Cl.
CPC ......... *F28D 7/1623* (2013.01); *F28D 7/1661* (2013.01); *F28D 7/1692* (2013.01); *F28F 9/00* (2013.01); *F28F 21/067* (2013.01); *F28F 2255/02* (2013.01); *F28F 2280/02* (2013.01); *Y02T 10/146* (2013.01)

(58) Field of Classification Search
CPC .... F28F 9/0131; F28F 9/0132; F28F 2275/08; F28F 2275/085; F28F 2275/12; F28F 2009/004; F28F 2280/06; F28F 2265/26–2265/32; F28F 2275/10; F28F 2230/00; F28F 9/0219; F28F 9/0224; F28F 9/0226; F28F 9/0229; F28F 9/0256; F28F 9/0241; F28F 9/0239; F28F 9/14; F28F 9/08; F28F 2255/02; F28F 2265/16; F28D 21/0003; F28D 2021/0082; F02B 29/045
USPC .................. 165/67, 81–84, 166, 167
See application file for complete search history.

(56) References Cited

U.S. PATENT DOCUMENTS

| | | | | |
|---|---|---|---|---|
| 3,775,972 A | | 12/1973 | Perpall | |
| 4,596,285 A | * | 6/1986 | Dinulescu | F28F 3/083 165/166 |
| 4,735,260 A | * | 4/1988 | Wohrl | F28D 7/06 165/135 |
| 4,776,387 A | * | 10/1988 | Newman | F28D 9/0037 165/166 |
| 6,029,345 A | * | 2/2000 | Christensen | B60K 11/04 165/140 |
| 6,059,025 A | * | 5/2000 | Hossfeld | F28F 9/001 165/166 |
| 6,474,408 B1 | * | 11/2002 | Yeh | F28D 9/0043 165/81 |
| 7,082,988 B2 | * | 8/2006 | Yoshida | F28F 9/0075 165/166 |
| 8,016,025 B2 | * | 9/2011 | Brost | F02B 29/0462 165/149 |
| 8,695,574 B2 | * | 4/2014 | Nguyen | F02B 29/0475 123/540 |
| 2003/0051497 A1 | * | 3/2003 | Nomura | B60H 1/00521 62/239 |
| 2004/0031600 A1 | * | 2/2004 | Kontu | F28F 9/22 165/167 |
| 2008/0185136 A1 | * | 8/2008 | Vastine | F02B 29/0462 165/283 |
| 2009/0014153 A1 | * | 1/2009 | Pimentel | F02B 29/0462 165/67 |
| 2012/0061053 A1 | * | 3/2012 | Geskes | F02B 29/0462 165/67 |

FOREIGN PATENT DOCUMENTS

| | | | | |
|---|---|---|---|---|
| DE | 102007042868 A1 | | 3/2009 | |
| DE | 102009012024 A1 | * | 9/2010 | .......... F02B 29/0462 |
| DE | 102009025282 A1 | | 12/2010 | |
| DE | 102009043264 A1 | | 3/2011 | |
| EP | 714797 A1 | | 6/1996 | |
| FR | 2645209 A1 | | 10/1990 | |
| GB | 1151696 A | * | 5/1969 | .............. B01D 1/06 |
| WO | WO 2008125485 A1 | * | 10/2008 | .......... F28D 7/0083 |
| WO | WO-2011/023516 A1 | | 3/2011 | |
| WO | WO 2011064301 A2 | * | 6/2011 | .......... F02B 29/0475 |

OTHER PUBLICATIONS

English abstract for DE-102007030464.
English abstract for DE-102007042868.
English abstract for DE-102009025282.
English abstract for DE-102009043264.
English abstract for EP-0714797.
English abstract for FR-2645209.

* cited by examiner

CHARGE-AIR COOLING DEVICE

CROSS-REFERENCE TO RELATED APPLICATIONS

This application claims priority to International Patent Application PCT/EP2013/054559 filed Mar. 7, 2013 and German Patent Application No. 10 2012 204 121.4 filed Mar. 15, 2012, the contents of which are hereby incorporated by reference in their entirety.

TECHNICAL FIELD

The present invention relates to a charge-air cooling device for a fresh-air system of an internal combustion engine, which is arranged in particular in a motor vehicle.

BACKGROUND

Charge-air cooling devices are required to cool the fresh air heated by charging in a charged internal combustion engine, before it is supplied to combustion chambers of the internal combustion engine. Hereby, the mass flow of the charge air can be increased, whilst at the same time the combustion temperatures, and hence the emissions, can be reduced.

Usually, a charge-air cooling device comprises a housing which contains a charge-air duct and can be integrated into the fresh-air system of the internal combustion engine so that the stream of fresh air of the fresh-air system flows through the fresh-air duct of the housing. In addition, a charge-air cooling device regularly comprises a heat exchanger which has an internal coolant path and an external charge-air path. The heat exchanger is arranged here in the housing so that the external charge-air path of the heat exchanger is integrated into the charge-air duct, so that the stream of charge-air directed in the charge-air duct is inevitably directed through the charge-air path of the heat exchanger. A coolant circulates in the internal coolant path. The heat exchanger can be connected for example to a cooling circuit of the internal combustion engine, so that the coolant of the cooling circuit of the internal combustion engine also flows through the coolant path of the heat exchanger. Likewise, the heat exchanger can also be connected to a separate cooling circuit. In this way, heat can be extracted from the charge-air.

There are various approaches in order to be able to accommodate the heat exchanger in the housing. For example, the housing can consist of several, for example of two, housing shells, so that the heat exchanger can be inserted into the first housing shell before the second housing shell is securely connected with the first housing shell, in order to close the housing. Alternatively, it is likewise possible to provide the housing with a mounting opening, through which the heat exchanger can be pushed into the housing in a longitudinal direction of the heat exchanger. In the pushed-in state, the charge-air duct then leads through the charge-air path.

Irrespective of the particular type of mounting or type of production, the problem exists of arranging the heat exchanger in the housing so that as few leaks as possible occur for the flow of charge-air, by which the charge-air flow can bypass the heat exchanger or respectively the charge-air path. Such leaks are possible for example in the region of a leading longitudinal end of the heat exchanger on pushing in of the heat exchanger, i.e. on a rear base of the heat exchanger. In order to prevent such a leak, sealing measures are basically possible which operate for example with separate sealing elements and are accordingly comparatively costly to produce.

SUMMARY

The present invention deals with the problem of indicating for a charge-air cooling device of the type mentioned in the introduction an improved embodiment which is distinguished in particular by being able to be manufactured inexpensively. Furthermore, in addition a sufficient seal is to be achievable to prevent leaks with regard to the charge-air flow.

This problem is solved in the present invention in particular by the subject matter of the independent claim. Advantageous embodiments are the subject matter of the dependent claims.

The invention is based on the general idea of equipping the housing in a receiving region, which receives the heat exchanger on pushing-in of the heat exchanger, with at least one elastic wall, which by the pushing in of the heat exchanger into the receiving region is transferred from a relaxed state, which prevails if the heat exchanger has not been pushed into the receiving region, into a stressed state, which prevails if the heat exchanger has been pushed into the receiving region. Expediently, the housing in the receiving region and the heat exchanger are coordinated with one another such that an inner cross section, delimited by the wall, of the receiving region is widened elastically in the stressed state in comparison with the relaxed state and bears in a prestressed manner directly against an outer cross section of the heat exchanger. Through the prestressed bearing, the realizing of a sufficient seal between the housing and the heat exchanger is simplified. An embodiment is preferred here, in which in the region of the contacting between the wall and the heat exchanger basically a seal which is designed as a separate component can be dispensed with.

The material of the housing, preferably a plastic, can be selected at least in the region of the elastic wall so that it is suitable in a particular manner for realizing a sufficient seal by direct contact with the heat exchanger, which usually consists of a metal material. It is also conceivable in particular to coat or respectively embody the housing at least in the region of the respective elastic wall on the inner side facing the charge-air duct with a sealing material, e.g. with a rubber-like elastomer plastic, e.g. by means of 2-component technology.

According to an advantageous embodiment, the elastic wall of the housing can be formed in the receiving region by a duct wall extending parallel to the longitudinal direction of the heat exchanger, preferably transversely, through the charge-air duct, which duct wall, in the stressed state, lies against a, preferably flat, longitudinal side of the heat exchanger. Therefore, in particular a separate seal in the region of the respective side wall can be dispensed with.

Embodiments are preferred here, in which the respective duct wall in the relaxed state is curved in a convex manner to the charge-air duct and/or in which two duct walls are provided, which lie opposite one another on the charge-air duct and which in the stressed state lie against two longitudinal sides of the heat exchanger which face away from one another.

In another embodiment, the invention is based on the general idea of equipping the housing opposite the mounting opening with a recess which is bordered laterally by a recess wall and which is arranged in the housing and adapted to the heat exchanger so that the heat exchanger, on pushing in with its rear base can be introduced into the recess. In the mounted state, the heat exchanger assumes a pushed-in state, in which the rear base of the heat exchanger engages into the recess of the housing. By the accommodating of the rear base in the said recess, a leak in the region of the rear base is significantly reduced. In addition, comparatively simple sealing measures can be realized between the rear base and the recess. For example, a circumferential seal can be provided, which seals the rear base with respect to the recess wall. However, an embodiment is preferred, in which in the region of the rear base basically a seal designed as a separate component can be dispensed with. In a particularly advantageous embodiment, the recess wall is of elastic design, such that by the pushing in of the rear base into the recess it is transferred from a relaxed state which prevails if the rear base has not been pushed into the recess, into a stressed state which prevails if the rear base has been pushed into the recess. In the stressed state, an internal cross section of the recess, surrounded by the recess wall, is widened elastically in comparison with the relaxed state, i.e. is enlarged, so that in the stressed state it bears in a prestressed manner directly against an outer cross section of the rear base. This prestressed, direct contacting between the rear base and the recess wall leads to a significant sealing effect, so that basically a separate seal can be dispensed with in this region.

According to an advantageous further development, the rear base in the pushed-in state can now engage free of play into the recess. The lack of play radially to the longitudinal direction of the heat exchanger leads to an improved sealing effect. Additionally or alternatively, the rear base in the pushed-in state can engage into the recess without an additional or respectively without a separate seal. Therefore a component, namely a separate seal in the region of the rear base, can be dispensed with, whereby the solution presented here is able to be realized in a particularly inexpensive manner.

In another advantageous embodiment, the recess wall can bear in a closed circumferential manner against the outer cross section of the rear base. Hereby, the risk of a leak in the region of the rear base can be additionally reduced. Preferably, the recess wall comes to abut flat here against the outer cross section of the rear base, whereby the sealing effect, in particular in the sense of a gap seal, is additionally improved.

According to another advantageous embodiment, the rear base can have a substantially rectangular outer cross section. A substantially rectangular outer cross section is characterized by four straight sides which are connected with one another via four corners, wherein the corners can also be rounded, for example for manufacturing reasons. In so far as the rear base has such a rectangular outer cross section, the recess wall expediently has four longitudinal sections which are connected with one another via four corner regions. The longitudinal sections of the recess wall can be curved in a convex manner in the relaxed state towards the inner cross section, or else can be rectilinear. In the stressed state, the longitudinal sections of the recess wall are substantially rectilinear or else are curved in a convex manner towards the inner cross section with a smaller curvature compared with the relaxed state. Through the elasticity of the recess wall, the latter can be elastically deformed on transferring from the relaxed state into the stressed state, in particular stressed in the circumferential direction, wherein the longitudinal sections of the recess wall which are curved inwards or straight in the relaxed state act as elastic elements which are stressed on transferring into the stressed state. Through the prestressing, the contacting between the recess wall and the rear base can also be ensured in the case of greater pressure differences between an inflow side of the heat exchanger and an outflow side of the heat exchanger.

According to another advantageous embodiment, the heat exchanger can have a front base opposite the rear base at its other longitudinal end, which front base comprises a coolant inlet and a coolant outlet. The coolant inlet and coolant outlet are fluidically connected here with the internal coolant path. The positioning of the coolant connections on the front base simplifies the sealed accommodating of the rear base in the recess.

According to a particularly advantageous further development, the front base can be configured so that in the mounted state it closes the mounting opening of the housing. In other words, in the mounted state the base forms a component part of the housing, so that a region of the outer skin of the housing is formed by the outer side of the front base. In so doing, a separate cover for closing the mounting opening can be dispensed with.

Alternatively, however, an embodiment is also conceivable, in which a separate cover is provided for closing the mounting opening, which cover has coolant connections which, when the cover is mounted, are fluidically connected with the coolant inlet and with the coolant outlet.

In another advantageous further development, provision can be made that the coolant inlet and the coolant outlet are adapted to be fluidically connected with a cooling circuit of the internal combustion engine. Consequently, the heat exchanger can be integrated particularly simply into an existing cooling circuit of the vehicle.

In another advantageous embodiment, the heat exchanger can have a cooler air inlet between its longitudinal ends on an inflow side arranged in the charge-air duct on the inflow side, and a cooler air outlet on an outflow side, opposite the inflow side, arranged on the outflow side in the charge-air duct. In addition, the heat exchanger can have between its longitudinal ends and between the inflow side and the outflow side an upper side and, lying opposite the latter, an underside. In order to now also reduce leaks of the charge-air flow in the region of the upper side or respectively in the region of the underside, the upper side can now be sealed with respect to the housing by means of an upper sealing element, wherein additionally or alternatively the underside can be sealed with respect to the housing by means of a lower sealing element. Such a sealing element extends expediently over the entire length of the heat exchanger, i.e. in the longitudinal direction of the heat exchanger along the entire upper side or respectively along the entire underside, preferably from the front base up to the rear base.

An embodiment is particularly expedient here, in which the upper sealing element is fastened on the upper side of the heat exchanger or respectively in which the lower sealing element is fastened on the underside of the heat exchanger. Consequently, the respective sealing element is a component part of the heat exchanger, which facilitates the mounting of the respective sealing element.

In a further advantageous further development, the upper sealing element can form, with an upper region of the housing, a longitudinal guide for the heat exchanger. Additionally or alternatively, the lower sealing element can form, with a lower region of the housing, a longitudinal guide for the heat exchanger. The realizing of a longitudinal guide with the aid of the respective seal and of an associated housing region simplifies the mounting of the heat exchanger, because through the longitudinal guide the heat exchanger can be pushed into the housing particularly simply so that its rear base finds the recess.

A further development is particularly expedient here, in which the upper sealing element has an upwardly open longitudinal groove, into which the upper region of the housing engages, which is configured for this as an upper web. Additionally or alternatively, the lower sealing element can have a downwardly open longitudinal groove, into which the lower region of the housing engages, which is configured for this as a lower web. The respective longitudinal guide is designed here as a tongue and groove guide, which can also be designated as a drawer guide and is distinguished by being able to be realized particularly simply and by an efficient longitudinal guidance of the heat exchanger.

According to another advantageous embodiment, the heat exchanger can be configured as a flat tube heat exchanger, in which several first flat tubes lead parallel to one another from an inlet duct to a deflection duct and in which several second flat tubes lead parallel to one another from the deflection duct to an outlet duct. Advantageously, the deflection duct is now constructed in the rear base, whereas the inlet duct and the outlet duct are constructed in the front base. Through this type of construction, the heat exchanger does not require any sealing measures in the region of the rear base, in order to seal the deflection duct with respect to the charge-air path. In addition, the coolant inlet and the coolant outlet can therefore be arranged simply on the same base, namely on the front base, which likewise simplifies the sealing measures.

An embodiment is particularly advantageous in which the heat exchanger is metallic, whereas the housing is made from plastic. A metallic heat exchanger is distinguished by a particularly high heat transfer capacity, whilst at the same time is can be constructed in a comparatively compact manner. A plastic housing, on the other hand, can be produced in a particularly inexpensive manner. In particular, the realization of the housing with plastic enables the configuration with an elastic recess wall. The elasticity of the plastic enables in addition an adapting of the housing to changing dimensions of the heat exchanger due to thermal reasons, which may exist.

An embodiment is advantageous, in which the housing has several separate charge-air tubes, into which the charge-air duct passes and which are associated with individual cylinders of the internal combustion engine. In this case, the housing of the charge-air cooling device forms the outflow-side end of the fresh-air system and serves for connecting the fresh-air system to the air inlet side of the internal combustion engine.

Further important features and advantages of the invention will emerge from the subclaims, from the drawings and from the associated description of the figures with the aid of the drawings.

It shall be understood that the features mentioned above and to be further explained below are able to be used not only in the respectively indicated combination, but also in other combinations or in isolation, without departing from the scope of the present invention.

Preferred example embodiments of the invention are illustrated in the drawings and are explained in further detail in the following description, wherein the same reference numbers refer to identical or similar or functionally identical components.

BRIEF DESCRIPTION OF THE DRAWINGS

There are shown, respectively diagrammatically.

DETAILED DESCRIPTION

Figure 1:
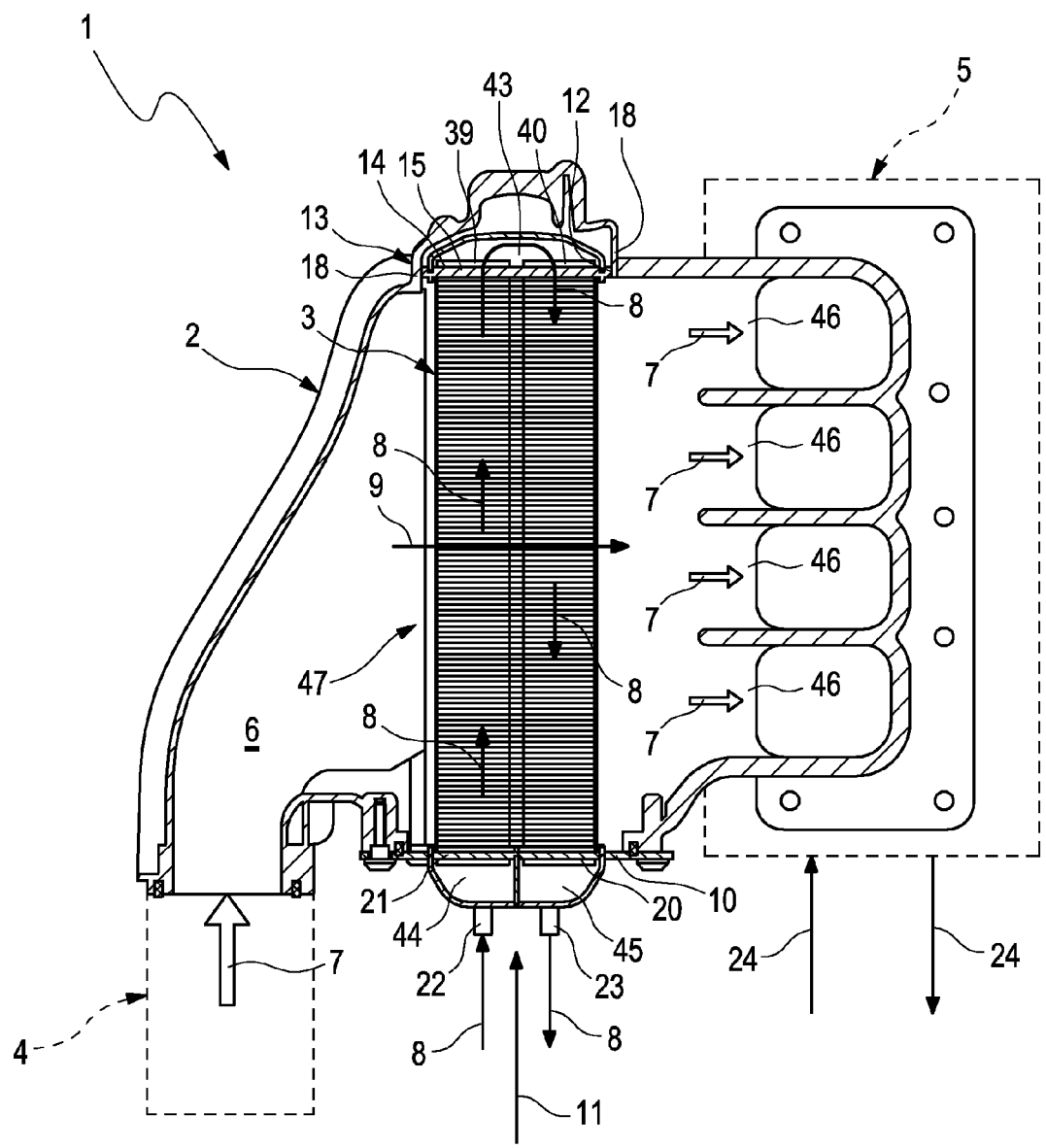
FIG. 1 a sectional view of a charge-air cooling device with a sectional plane parallel to a longitudinal direction of a heat exchanger of the charge-air device, FIG. 2 a sectional view of the charge-air cooling device transversely to the longitudinal direction of the heat exchanger, with the heat exchanger absent, FIG. 3 a sectional view as in FIG. 2, but with the heat exchanger inserted, FIG. 4 a sectional view as in FIG. 3, but with a sectional plane offset axially with respect to the longitudinal direction of the heat exchanger.
Figure 2:
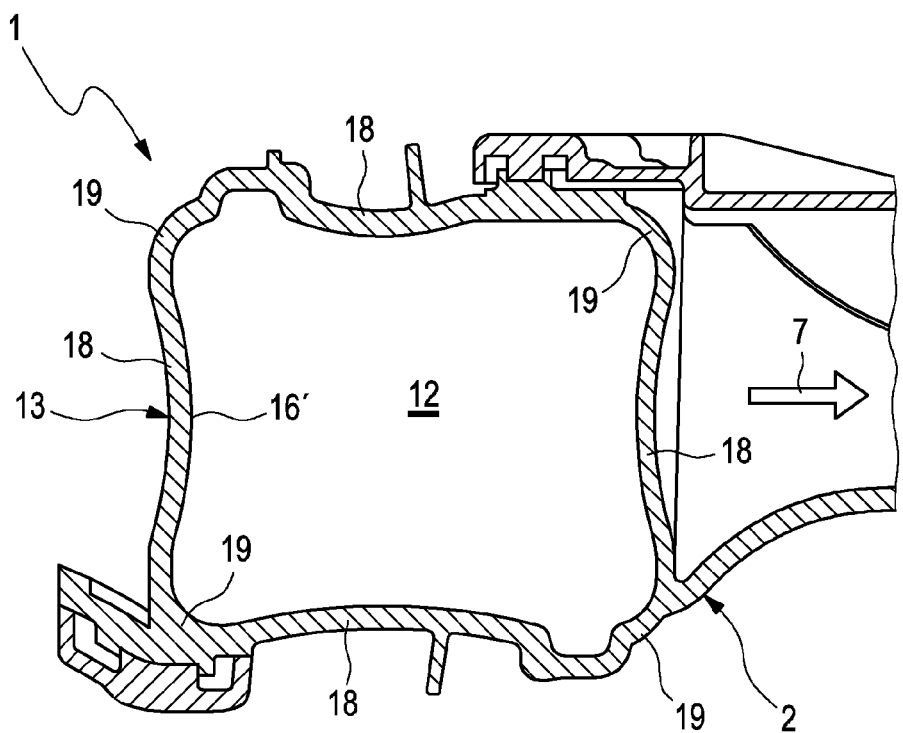
Figure 3:
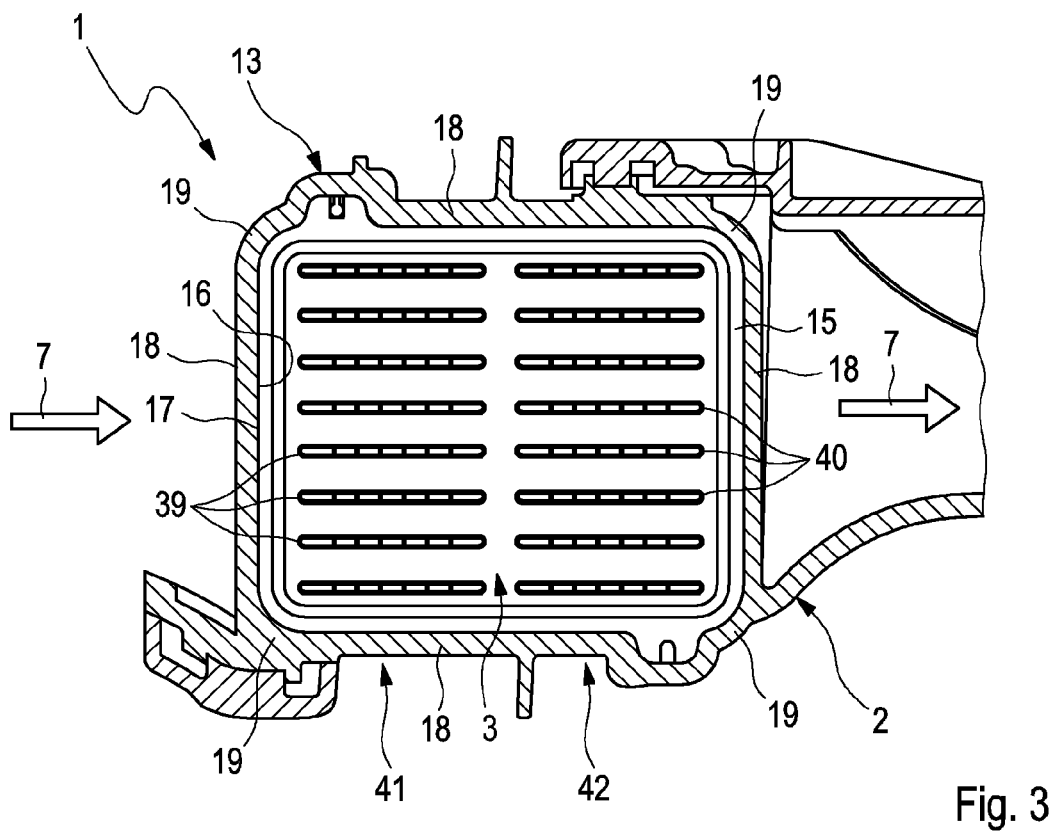
Figure 4:
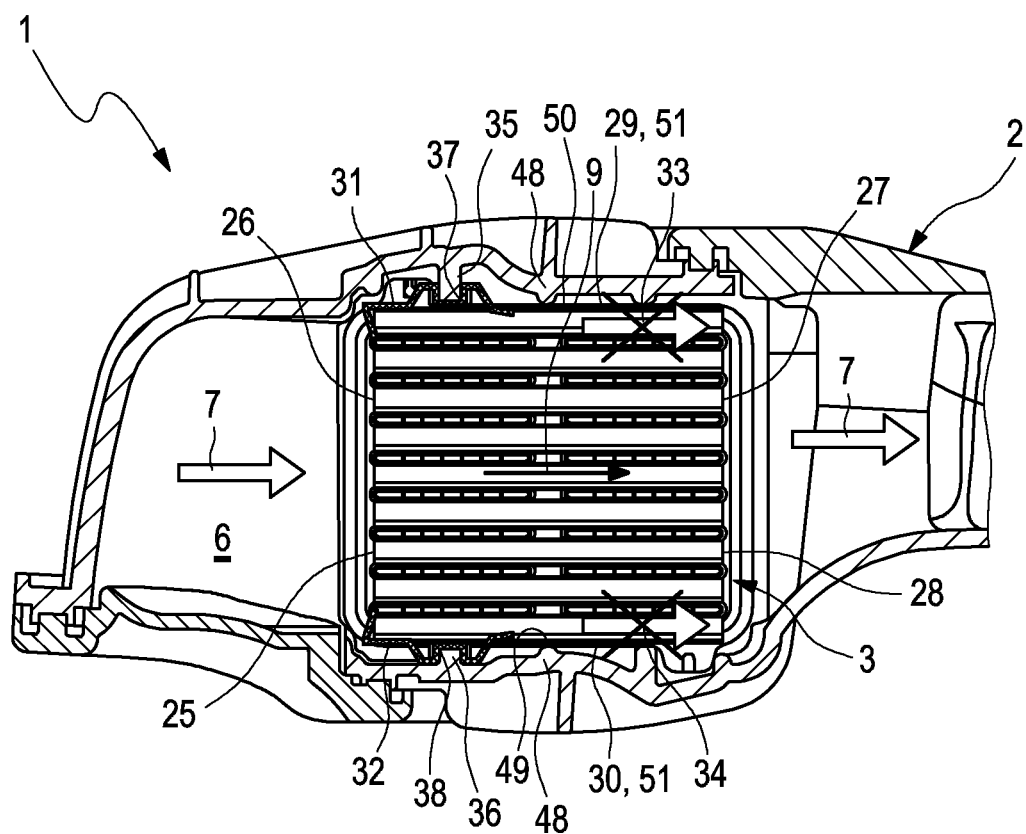

According to FIGS. 1-4, a charge-air cooling device 1 comprises a housing 2 and a heat exchanger 3. The heat exchanger 3 is inserted into the housing 2. FIGS. 1, 3 and 4 show a mounted state, in which the heat exchanger 3 is inserted into the housing 2. In contrast thereto, FIG. 2 shows a non-mounted state, in which the heat exchanger 3 is absent, i.e. is not inserted into the housing 2.

The cooling device 1 is provided for a use in a fresh-air system 4 indicated by a broken line in FIG. 1, by means of which fresh air can be supplied to an internal combustion engine 5, likewise indicated by a broken line in FIG. 1. The internal combustion engine 5 is charged and is preferably arranged in a motor vehicle and serves there for driving the vehicle. The housing 2 contains a charge-air duct 6. With a housing 2 integrated into the fresh-air system 4, the charge-air duct 6 directs the stream of charge-air transported in the fresh-air system 4, which stream is indicated in FIG. 1 by an arrow 7. The charge-air is charged here by means of a charging device, which is not shown here, in particular a compressor of an exhaust gas turbocharger, whereby its pressure and its temperature have increased. The charge-air cooling device 1 now serves for cooling the charged air. For this, the heat exchanger 3 has an internal coolant path 8, indicated by arrows in FIG. 1, and an external charge-air path 9, likewise indicated by an arrow, which are connected with one another in a manner separated with regard to media but in a heat-transmitting manner.

The housing 2 has a mounting opening 10, through which the heat exchanger 3 is able to be pushed in its longitudinal direction 11 into the housing 2. In the pushed-in state, which is illustrated in FIGS. 1, 3 and 4, the heat exchanger 3 is situated in the housing 2 so that the charge-air duct 6 of the housing 2 leads through the charge-air path 9 of the heat exchanger 3. To receive the heat exchanger 3, the housing 2 has a receiving region 47, which extends substantially transversely through the charge-air duct 6.

The housing 2 now has in this receiving region 47, opposite the mounting opening 10, a recess 12 on an inner side facing the charge-air duct 6, which recess is bordered laterally by a recess wall 13 in accordance with FIGS. 2 and 3. According to FIGS. 1 and 3, the heat exchanger 3 has, at its leading longitudinal end 14 on pushing in, a rear base 15, which in the pushed-in state of the heat exchanger 3 engages into said recess 12. The recess wall 13 is now of elastic design, such that by the pushing in of the rear base 15 it can be transferred from a relaxed state, illustrated in FIG. 2, which prevails if the heat exchanger 3 is absent or respectively if the rear base 15 has not been pushed into the recess 12, into a stressed state, which can be seen in FIG. 3. The stressed state is then present when the rear base 15 has been introduced into the recess 12. The recess wall 13 surrounds an inner cross section 16 or respectively 16' of the recess 12, wherein the inner cross section 16 in the stressed state according to FIG. 3 is widened in comparison with the inner cross section 16' in the relaxed state according to FIG. 2. In the stressed state, the inner cross section 16 bears in a prestressed manner directly against an outer cross section 17 of the rear base 15. The elasticity of the recess wall 13 and its dimensions are selected so that the rear base 15 in the pushed-in state engages into the recess 12 in a manner free of play. The recess wall 13 in accordance with FIG. 3 comes into abutment, in a closed circumferential manner, against the outer cross section 17 of the rear base 15, wherein in addition in circumferential direction respectively a flat abutment is preferred. In this respect, a sealed contacting between the recess wall 13 and the rear base 15 can be realized here, so that the cooling device 1 manages without an additional separate seal in the region of the rear base 15 with respect to the recess wall 13. The elasticity of the recess wall 13 enables an elastic deformation on transferring into the stressed state, in particular in connection with an elastic expansion of the recess wall 13 in its circumferential direction.

In the embodiment shown here, the rear base 15 has a substantially rectangular outer cross section. The recess wall 13 has four longitudinal sections 18 and four corner regions 19. Every two adjacent longitudinal sections 18 in circumferential direction are connected with one another via a corner region 19. In the relaxed state according to FIG. 2, the longitudinal sections 18 are curved in a convex manner towards the inner cross section 16' or respectively towards the interior of the recess 12. In the stressed state according to FIG. 3, on the other hand, the longitudinal sections 18 are rectilinear. Alternatively, an embodiment is basically also conceivable, in which the longitudinal sections 18 are also curved in the stressed state according to FIG. 3 in a convex manner towards the inner cross section 16 or respectively towards the interior of the recess 12, but with a smaller curvature, i.e. with a greater radius of curvature than in the relaxed state according to FIG. 2. In another embodiment, provision can be made that the longitudinal sections 18 are (also) substantially rectilinear in the relaxed state. Expediently, the transferring into the stressed state then leads principally to a rotation and stressing of the longitudinal sections 18 in their longitudinal direction.

In accordance with FIG. 1, the heat exchanger 3 has, opposite its rear base 15, at its other longitudinal end 20 a front base 21. The front base 21 has a coolant inlet 22 and a coolant outlet 23, which are fluidically connected with the internal coolant path 8. In the example which is shown, the front base 21 closes the mounting opening 10, so that the front base 21 forms a component part of the outer side of the housing 2. The coolant connections of the heat exchanger 3, i.e. the coolant inlet 22 and the coolant outlet 23 are adapted here so that they can be fluidically connected with a cooling circuit 24 of the internal combustion engine 5 indicated by arrows. In other words, the heat exchanger 3 of the charge-air cooling device 1 can be integrated into the cooling circuit 24 of the internal combustion engine 5.

According to FIG. 4, the heat exchanger 3 has a cooler air inlet 26 between its longitudinal ends 14, 20 on an inflow side 25 arranged in the charge-air duct 6 on the inflow side, and a cooler air outlet 28 on an outflow side 27 arranged in the charge-air duct 6 on the outflow side. The inflow side 25 and outflow side 27 lie opposite one another here, likewise the cooler air inlet 26 and the cooler air outlet 28. The heat exchanger 3 has in addition between its longitudinal ends 14, 20 and in the circumferential direction between the inflow side 25 and the outflow side 27 an upper side 29 and, lying opposite the latter, an underside 30. In the example of FIG. 4, the upper side 29 is sealed with respect to the housing 2 by means of an upper sealing element 31, whilst the underside 30 is sealed with respect to the housing 2 by means of a lower sealing element 32. The upper sealing element 31 is fastened here on the upper side 29, i.e. on the heat exchanger 3. Here, also, the lower sealing element 32 is fastened on the underside 30, i.e. on the heat exchanger 3.

The upper sealing element 31 prevents an upper leakage flow 33 of the charge-air flow 7, indicated by a cancelled arrow, which attempts to bypass the heat exchanger 3 on its upper side 29. The lower sealing element 32 prevents a lower leakage flow 34 of the charge-air flow 7, likewise indicated by a cancelled arrow, which attempts to bypass the heat exchanger 3 on its underside 30.

The upper sealing element 31 cooperates with an upper region 35 of the housing 2 to form a longitudinal guide for the heat exchanger 3 in the housing 2. In the example, the lower sealing element 32 also cooperates with a lower region 36 of the housing 2 to form a longitudinal guide for the heat exchanger 3 in the housing 2. In the example of FIG. 4, the upper sealing element 31 has for this an upwardly open longitudinal groove 37, into which the upper region 35 of the housing 2 engages, which is configured to form an upper web for this. In an analogous manner thereto, the lower sealing element 32 has a downwardly open longitudinal groove 38, into which the lower region 36 of the housing 2 engages, which is configured as a lower web for this.

Additionally or alternatively to the sealing elements 31, 32 shown in FIG. 4, a sufficient or additional seal between the housing 2 and the heat exchanger can also be realized with the aid of at least one elastic duct wall 48, which can be constructed in the receiving region 47 on the housing 2. In the example of FIG. 4, two such elastic duct walls 48 are provided, which lie opposite one another on the charge-air duct 6. In an analogous manner to the recess wall 13 mentioned above, these duct walls 48 can be transferred by the pushing in of the heat exchanger 3 into the receiving region 47 from a relaxed state, which prevails if the heat exchanger 3 has not been pushed into the receiving region 47, into a stressed state, which prevails if the heat exchanger 3 has been pushed into the receiving region 47. In the stressed state shown in FIG. 4, an inner cross section 49 of the receiving region 47, delimited by the two duct walls 48, is now widened elastically in comparison with the relaxed state and according to FIG. 4 bears in a prestressed manner directly against an outer cross section 50 of the heat exchanger 3. The two duct walls 48 bear here respectively on a longitudinal side 51 against the outer cross section 50 of the heat exchanger 3. In the example of FIG. 4, the two longitudinal sides 51 are formed by the upper side 29 and the underside 30.

In order to be able to achieve the desired sealed and expediently prestressed contacting between the housing 2 and the heat exchanger 3, provision can be made that the two duct walls 38 in the relaxed state are curved in a convex manner to the charge-air duct 6, and only in the relaxed state assume a shape—in particular rectilinear—adapted to the respective longitudinal side 51.

According to FIGS. 3 and 4, the heat exchanger 3 is expediently configured as a flat tube heat exchanger, which has several first flat tubes 39 and several second flat tubes 40, which run respectively parallel to one another. The first flat tubes 39 are stacked on one another transversely to the longitudinal direction 11 of the heat exchanger 3 and form a first flat tube stack 41. In the example, the first flat tube stack 41 is arranged on the inflow side. The second flat tubes 40 are stacked on one another in an analogous manner to the first flat tubes 39 and form a second flat tube stack 42, which in the example which is shown are arranged on the outflow side. However, a different arrangement is preferred, in which the first flat tubes 39 are arranged on the outflow side, whereas the second flat tubes 40 are arranged on the inflow side. According to FIG. 1, the heat exchanger 3 has a deflection duct 43 in the rear base 15 and has in its front base 21 an inlet duct 44 and an outlet duct 45. The first flat tubes 39 lead from the inlet duct 44 to the deflection duct 43. The second flat tubes 40 lead from the deflection duct 43 to the outlet duct 45. The coolant inlet 22 is fluidically connected with the inlet duct 44. The coolant outlet 22 is fluidically connected with the outlet duct 45. In the embodiment shown in FIG. 1, the inlet duct 44 is arranged in the charge-air path 9 upstream of the outlet duct 45, which leads to a connection according to the direct current principle. In the preferred embodiment already indicated above, which is not shown, to realize the counter-current principle, the inlet duct 44 is arranged on the outflow side in the charge-air path 9, whereas the outlet duct 45 is then arranged on the inflow side in the charge-air path 9.

Turbulators, which are not designated in further detail, are arranged in the flat tubes 39, 40 in order to improve the heat transmission between the respective cooling fluid and the flat tubes 39, 40. The flat tubes 39, 40 are arranged spaced apart from one another in the respective stack direction, in order to form, transversely to the stack direction and transversely to the longitudinal direction of the flat tubes 39, 40, intermediate spaces for the formation of the external charge-air path 9. Turbulators can again be provided for spacing the adjacent flat tubes 39, 40, in order to improve the heat transmission between the charge-air and the flat tubes 39, 40.

According to FIG. 1, the housing 2 has several separate charge-air tubes 46, which are associated with individual cylinders of the internal combustion engine 5. The charge-air duct 6 of the housing 2 passes over into the separate charge-air tubes 46. Consequently, the charge air stream 7, which is cooled by means of the heat exchanger 3, arrives via the charge-air tubes 46 at the combustion chambers of the internal combustion engine 5.

Expediently, the heat exchanger 3 is made with metal, i.e. comprises metallic flat tubes 39, 40 and metallic bases 15, 21. In contrast to this, the housing 2 is preferably made from plastic. In particular, it is a single-part or multipart injection moulded part.

The invention claimed is:

1. A charge-air cooling device for a fresh-air system of an internal combustion engine, comprising:
   a housing which contains a charge-air duct for conveying a charge-air flow, the housing including a mounting opening and a receiving region;
   a heat exchanger having a longitudinal axis and including an internal coolant path and an external charge-air path;
   the heat exchanger insertable into the housing through the mounting opening in an axial direction of the longitudinal axis of the heat exchanger such that in a pushed-in state the longitudinal axis of the heat exchanger extends transverse to the charge-air flow and the charge-air duct leads through the charge-air path when the heat exchanger is arranged in the housing;
   the receiving region of the housing including at least one elastic wall extending along the axial direction of the longitudinal axis;
   the at least one elastic wall is configured to transfer from a relaxed state to a stressed state by interacting with an outer cross section of the heat exchanger when the heat exchanger is arranged in the receiving region in the pushed-in state, the outer cross section defined by at least one radially outer side of the heat exchanger disposed radially outwards of the internal coolant path with respect to the longitudinal axis; and
   wherein the at least one elastic wall defines an inner cross section of the receiving region, and the at least one elastic wall is widened elastically in the stressed state in comparison with the relaxed state and bears in a prestressed manner directly against the outer cross section of the heat exchanger to define a sealed contacting in the stressed state between the at least one elastic wall defining the inner cross section and the at least one radially outer side defining the outer cross section of the heat exchanger to seal off a bypass air flow in the charge-air duct around the heat exchanger, and wherein the sealed contacting extends continuously along the at least one radially outer side between the outer cross section of the heat exchanger and the inner cross section of the receiving region.

2. The charge-air cooling device according to claim 1, wherein
   the at least one elastic wall defining the inner cross section includes at least one duct wall extending parallel to the longitudinal axis of the heat exchanger through the charge-air duct, and the at least one radially outer side defining the outer cross section of the heat exchanger includes at least one longitudinal side extending along the axial direction of the longitudinal axis, and wherein the at least one duct wall in the stressed state bears against the at least one longitudinal side of the heat exchanger to define the sealed contacting extending axially along the longitudinal axis of the heat exchanger and transverse to the charge-air flow through the charge-air duct.

3. The charge-air cooling device according to claim 2, wherein at least one of:
   the at least one duct wall in the relaxed state is curved in a convex manner to the charge-air duct; and
   the at least one duct wall includes two duct walls lying opposite one another on the charge-air duct and the at least one longitudinal side includes at least two longitudinal sides facing away from one another, and wherein the two duct walls defining the inner cross section in the stressed state bear against the at least two longitudinal sides defining the outer cross section.

4. The charge-air cooling device according to claim 1, wherein:
   the housing in the receiving region includes a recess disposed opposite the mounting opening;
   the at least one elastic wall includes a recess wall which borders the recess laterally;
   the heat exchanger includes a rear base at an axial end with respect to the longitudinal axis which engages into the recess in the pushed-in state;
   the recess wall defines the inner cross section of the receiving region and the rear base includes the at least one radially outer side defining the outer cross section of the heat exchanger; and
   the recess wall is widened elastically in the stressed state compared to the relaxed state and bears in a prestressed manner directly against the rear base to define the sealed contacting between recess wall defining the inner cross section and the at least one radially outer side of the rear base defining the outer cross section.

5. The charge-air cooling device according to claim 4, wherein the recess wall includes a plurality of wall sections, and wherein at least one of:
the rear base in the pushed-in state engages via the at least one radially outer side at least one wall section of the plurality of wall sections free of play in a radial direction of the longitudinal axis to provide the sealed contacting extending along the at least one radially outer side in a circumferential direction of the longitudinal axis between the outer cross section and the inner cross section; and
the plurality of wall sections in the pushed-in state abut free of play in a radial direction of the longitudinal axis against a plurality of radially outer sides defined by the rear base circumferentially about the longitudinal axis to provide the sealed contacting extending continuously around the rear base in a circumferential direction of the longitudinal axis between the outer cross section and the inner cross section.

6. The charge-air cooling device according to claim 1, wherein:
the heat exchanger includes a rear base disposed at an axial end with respect to the longitudinal axis, the rear base including the at least one radially outer side and having a substantially rectangular geometry that defines the outer cross section;
the at least one wall includes recess wall having a plurality of wall sections to delimit a recess of the housing;
the plurality of wall sections in the relaxed state are one of curved in a convex manner towards the recess and rectilinear; and
the plurality of wall sections in the stressed state are one of substantially rectilinear and curved in a convex manner towards the recess with a smaller curvature in comparison with the relaxed state.

7. The charge-air cooling device according to claim 1, wherein the heat exchanger includes a rear base on an axial end with respect to the longitudinal axis, and a front base disposed on another axial end opposite the rear base, wherein the front base of the heat exchanger includes a coolant inlet and a coolant outlet, which are fluidically connected with the internal coolant path.

8. The charge-air cooling device according to claim 7, wherein the coolant inlet and the coolant outlet are fluidically connected with at least one of a cooling circuit of the internal combustion engine and a separate cooling circuit.

9. The charge-air cooling device according to claim 1, wherein:
the heat exchanger includes two opposing axial ends with respect to the longitudinal axis, and between the axial ends, an inflow side arranged in the charge-air duct having a cooler air inlet and an outflow side arranged in the charge-air duct lying opposite the inflow side, the outflow side having a cooler air outlet;
the heat exchanger further includes, between the axial ends and between the inflow side and the outflow side, an upper side and an underside lying opposite thereto; and
wherein at least one of the upper side is sealed via an upper sealing element and the underside is sealed via a lower sealing element with respect to the housing.

10. The charge-air cooling device according to claim 9, wherein at least one of:
the upper sealing element is fastened on the upper side of the heat exchanger, and the lower sealing element is fastened on the underside of the heat exchanger.

11. The charge-air cooling device according to claim 9, wherein at least one of:
the upper sealing element forms a longitudinal guide for the heat exchanger with an upper region of the housing, and
the lower sealing element forms a longitudinal guide for the heat exchanger with a lower region of the housing.

12. The charge-air cooling device according to claim 11, wherein at least one of:
the upper sealing element has an upwardly open longitudinal groove, and a corresponding upper region of the housing is configured as an upper web, wherein the upwardly open longitudinal groove engages into the upper web; and
the lower sealing element has a downwardly open longitudinal groove, and a corresponding lower region of the housing is configured as a lower web, wherein the downwardly open longitudinal groove engages into the lower web.

13. The charge-air cooling device according to claim 1, wherein:
the heat exchanger is configured as a flat tube heat exchanger,
the heat exchanger including a plurality of first flat tubes leading parallel to one another from an inlet duct to a deflection duct, and
a plurality of second flat tubes leading parallel to one another from the deflection duct to an outlet duct,
wherein the deflection duct is arranged in a rear base on a leading longitudinal end of the heat exchanger, and the inlet duct and the outlet duct are arranged in a front base of an opposing longitudinal end of the heat exchanger.

14. The charge-air cooling device according to claim 1, wherein the heat exchanger is metallic and the housing is plastic.

15. The charge-air cooling device according to claim 1, wherein the housing includes a plurality of separate charge-air tubes, into which the charge-air duct passes, wherein the charge-air tubes are associated with individual cylinders of the internal combustion engine.

16. The charge-air cooling device according to claim 7, wherein the front base closes the mounting opening.

17. The charge-air cooling device according to claim 7, further comprising a cover closing the mounting opening, the cover including coolant connections fluidically connected with the coolant inlet and coolant outlet when the cover is mounted.

18. A charge-air cooling device for a fresh air system of an internal combustion engine, comprising:
a heat exchanger having a longitudinal axis and defining an internal coolant path and an external charge-air path, the heat exchanger including at least one side section disposed radially outwards from the internal coolant path with respect to the longitudinal axis, the at least one side section defining an outer cross section in an axial direction of the longitudinal axis;
a housing defining a charge-air duct for conveying a charge-air flow and including an elastic wall providing a receiving region for receiving the heat exchanger, wherein the heat exchanger engages the elastic wall via the outer cross section and extends in the charge-air duct with the longitudinal axis transverse to the charge-air flow in a mounted state when the heat exchanger is arranged in the receiving region of the housing;

the elastic wall of the receiving region configured to transfer from a relaxed state to a stressed state by interacting with the outer cross section of the heat exchanger in the mounted state, wherein the elastic wall defines an inner cross section of the receiving region that is elastically widened in the stressed state as compared to the relaxed state and bears elastically prestressed against the at least one side section defining the outer cross section of the heat exchanger in the mounted state; and wherein the elastic wall defining the inner cross section of the receiving region engages play-free in a radial direction of the longitudinal axis against the at least one side section defining the outer cross section of the heat exchanger in the stressed state to define a prestressed and sealed contacting between the inner cross section and the outer cross section to facilitate sealing off a bypass air flow in the charge-air duct around the heat exchanger, and wherein the prestressed and sealed contacting defined by the elastic wall engaging play-free in the radial direction against the at least one side section extends continuously across the at least one side section defining the outer cross section of the heat exchanger.

19. The charge-air cooling device according to claim 18, wherein the at least one side section of the heat exchanger includes a plurality of side sections together providing a base disposed on an axial end of the heat exchanger with respect to the longitudinal axis, the base defining the outer cross section of the heat exchanger;

the receiving region of the housing includes a recess for receiving the base and the elastic wall defining the inner cross section includes a plurality of wall sections connected to one another and surrounding the recess; and wherein the plurality of wall sections in the stressed state are in play-free radial engagement with the base in a circumferential direction of the longitudinal axis such that the prestressed and sealed contacting extends continuously in the circumferential direction between the inner cross section and the outer cross section.

20. The charge-air cooling device according to claim 18, wherein the at least one side section of the heat exchanger includes at least one longitudinal side extending in the axial direction, the at least one longitudinal side defining the outer cross section of the heat exchanger;

wherein the elastic wall defining the inner cross section includes at least one duct wall extending axially to the at least one longitudinal side with respect to the longitudinal axis of the heat exchanger; and wherein the at least one duct wall in the stressed state is in play-free radial engagement with the at least one longitudinal side in the axial direction such that the prestressed and sealed contacting extends axially between the inner cross section and the outer cross section and transverse to the charge-air flow through the charge-air duct.

* * * * *